Patented Oct. 26, 1948

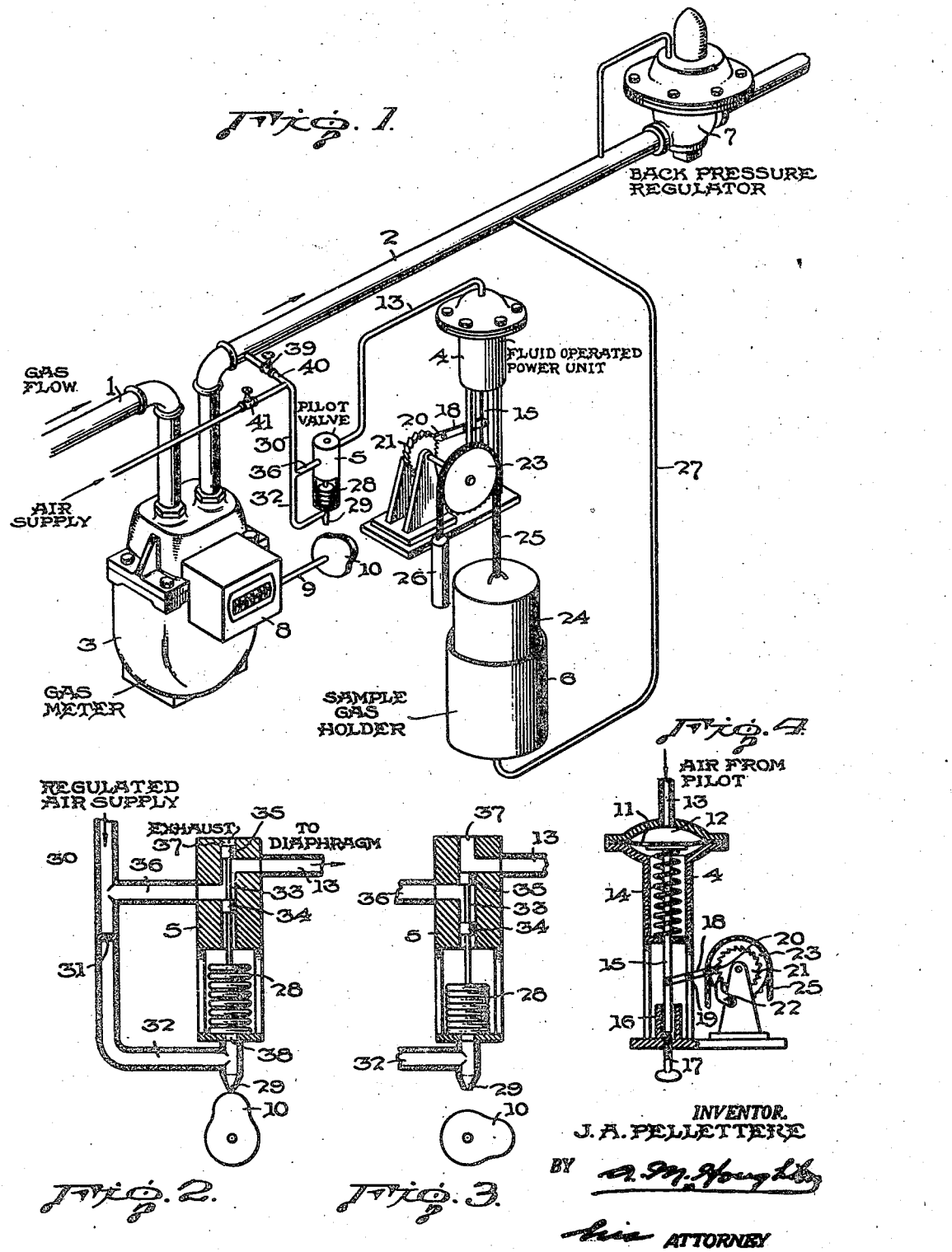

2,452,143

UNITED STATES PATENT OFFICE 2,452,143

FLUID SAMPLING SYSTEM

Joseph A. Pellettere, Pittsburgh, Pa., assignor to Gulf Oil Corporation, Pittsburgh, Pa., a corporation of Pennsylvania Application November 26, 1947, Serial No. 788,216

9 Claims. (Cl. 73—421.5)

This invention relates to a fluid sampling system and more particularly to a gas sampling system which is capable of collecting a composite gas sample from a closed line in proportion to the flow in that line.

The principal object accomplished by my invention is the provision of a device to accumulate a representative sample from a stream of gas of varying composition and of varying rate of flow.

Another object accomplished by my invention is the provision of a fluid sampling system which will, over a period of time, incrementally accumulate a composite gas sample from a conduit in direct proportion to the volume of gas flowing therethrough.

A further object accomplished by my invention is the provision of a gas sampling system incorporating practical design and simple operational features therein so as to require a minimum of attention during sampling.

Other objects will appear hereinafter.

In the conduct of chemical processes it is often necessary or desirable to accumulate a representative gas sample, that is, a sample composed of equal increments for each unit volume of gas passing through a conduit, irrespective of variations in velocity of flow through the conduit. The problem of collecting such a sample is a relatively simple one where the gas flow and gas pressure remain substantially constant in the line from which a sample is desired. On the other hand, when the gas is subject to frequent variations in composition, pressure, and rate of flow, as is often the case in petroleum refinery operations, and particularly in pilot plant operations, the taking of representative gas samples involves a rather difficult problem. This is more apparent when it is understood that a composite sample must be accumulated of increments taken intermittently over a period of time to be truly representative of the yield of a continuing operation. I have found that where the rate of flow, the pressure and the composition of the gas are varying from moment to moment, common gas sampling devices do not gather successive increments that are truly proportional to the quantity of gas flowing in the line that is being sampled.

The invention is particularly advantageous in that it provides a sampling system that will collect over any desired period of time a sample which is truly representative of the average composition of the fluid flowing through a line during that period. Another advantage is the adaptability of the invention to the sampling of combustible substances or to sampling in the presence of combustible substances. Such sampling is generally regarded as hazardous where the use of sampling devices essentially of an electrical nature is contemplated. However, the utilization of a pneumatic control system in the embodiment of my invention here shown and described substantially eliminates any danger of fire or explosion. Further advantages appear in the novel construction and arrangement of the component parts of the system and the flexibility resulting therefrom.

My invention is exemplified by the accompanying Figures 1 to 4, inclusive, a description of which follows:

Fig. 1 is an isometric view of one embodiment of my sampling system.

Fig. 2 is a vertical sectional view of pilot valve 5 and its connection when a periodic sample is being taken.

Fig. 3 is a vertical sectional view of pilot valve 5 when no sample is being taken.

Fig. 4 is a vertical sectional view of fluid operated power unit 4 and its associated mechanism.

Fig. 1 shows the entire device, and comprises as the principal elements a gas line 1 and 2, a gas meter 3, fluid operated power unit 4, pilot valve 5, gas holder 6, back pressure regulator 7, and various interconnecting lines as shown. The gas, a portion of which it is desired to obtain as a sample, flows through lines 1 and 2 in which is interposed gas meter 3. The gas meter has an integrating mechanism 8 and the shaft of this integrating mechanism carries an extension 9 fitted with a cam 10.

Fluid operated power unit 4 comprises a flexible diaphragm 11 mounted within a chamber 12. A fluid pressure line 13 connects to the upper side of the diaphragm 11 and displacement of the diaphragm by pressure on the upper side is resisted by spring 14 on the lower side thereof. Attached to the lower side of the diaphragm 11 is stem 15 guided at its lower end by guide-piece 16. The vertical movement of stem 15 is limited by an adjustable stop 17 in the base of guide-piece 16. Connected to stem 15 is lever 18 fulcrumed at 19 and carrying on its outward extremity pawl 20. When the pressure of the fluid in line 13 operates on diaphragm 11 it forces that diaphragm downward against the resisting pressure of spring 14. This downward motion of diaphragm 11 carries with it the attached stem 15. At the same time the end of lever 18 attached to stem 15 is forced downward and, due to its being fulcrumed at 19, the outer end of lever 18 moves upward. In moving upward, the pawl 20, carried on the end of lever 18, effects partial rotation of ratchet 21. When pressure is released on diaphragm 11, the spring 14 causes upward motion of diaphragm 11, stem 15 and the attached end of lever 18. The resulting retreat of pawl 20 from ratchet 21 does not result in counter rotation of ratchet 21 due to the operation of pawl 22. The rising motion of stem 15 lowers the position of pawl 20 and positions it against a subsequent tooth of ratchet 21, thereby placing it in position to further rotate ratchet 21 the next time diaphragm 11 and stem 15 are forced downward. A sprocket wheel 23 is mounted on the same shaft as ratchet 21, and both ratchet and sprocket are permanently fastened to the shaft so that the rotation of the ratchet will be transmitted to the sprocket.

A base 6 and bell 24 form a conventional liquid-sealed gas-holder to receive the desired sample of gas. The bell 24 of the gas-holder is raised progressively by chain 25 which passes over the previously described sprocket wheel 23 and is balanced by a counter-weight 26.

The purpose of this device is to take a small sample of gas from gas-line 2 through line 27 into gas-holder 24 each time a previously determined quantity of gas is passed through gas meter 3. To accomplish this purpose a pilot valve 5 is provided to alternately pass and interrupt the stream of fluid under pressure supplied through line 13 to the upper side of diaphragm 11 of the fluid operated power unit 4. The frequency of passing and interrupting the energizing fluid to the upper side of the diaphragm is determined by the number of nodes on the periphery of a cam 10 attached to integrator 8 of gas meter 3. If the flow integrator 8 were required to carry the full power load of opening and breaking the fluid supply in line 13, it would seriously interfere with the accuracy of gas meter 3 and therefore the pilot valve 5, in combination with cam 10 is designed to put no substantial load on meter integrator 8 in rotating cam 10. Pilot valve 5 is a pneumatically operated pilot valve that not only interrupts and opens the supply of energizing fluid to fluid operated power unit 4, but also is itself operated by the same supply of gas under pressure. This gas may advantageously be air, although, if the pressure be adequate, it may be gas from line 2. The heart of the pilot valve is a light metallic bellows 28 of the Sylphon type. Referring to Figs. 1, 2 and 3, it will be noted that when the face of cam 10 is away from nozzle 29, the pneumatic pressure in line 30 causes a restricted flow through orifice 31 and line 32. The openings in orifice 31 and nozzle 29 are so proportioned that discharge of gas through nozzle 29 will prevent the accumulation of any substantial pressure in line 32 and the inside of connected bellows 28. Therefore, when the face of cam 10 is removed from nozzle 29, as shown in Figs. 1 and 3, bellows 28 assumes its naturally contracted position in Fig. 3. Connected to the upper end of bellows 28 is valve stem 33 carrying cut-offs 34 and 35. It will be observed from Fig. 3 that when nozzle 29 is opened by removal therefrom of cam 10, valve cut-off element 35 will prevent the passage of pressure fluid from inlet port 36 to the power unit through line 13, and by depressing the position of cut-off 35 will permit the escape of fluid pressure from the upper side of power unit diaphragm 11 through line 13 and escape port 37 to the atmosphere. When integrator 8 brings cam 10 into the position shown in Fig. 2, the cam comes within say 0.001 of an inch or 0.002 of an inch of nozzle 29, substantially closes the nozzle 29 and causes the fluid pressure in line 32 to rise to a pressure closely approaching that in line 30. This increased pressure in line 32, communicating through orifice 38 to the inside of bellows 28, causes expansion of bellows 28. That expansion of bellows 28 raises valve stem 33 to the position shown in Fig. 2 and it will be noted that in such position cut-off element 35 closes the connection between line 13 and discharge port 37, and simultaneously opens the pressure line from line 30 through 36 to line 13 and the upper side of diaphragm 11 of fluid operated power unit 4.

A back pressure regulator 7 is positioned in main gas line 2 and maintains a uniform pressure in sampling line 27 and gas-holder 6.

Operation of the sampling device includes the following sequence of operations. The gas-holder bell 24 is completely lowered into its base 6 so that no gas is contained therein. Depending upon conditions of the gas in main 2 and the particular requirements of the operator, the size of sample increments may be varied by adjusting screw 17 in the base of the fluid operated power unit 4. The gas stream from which a sample is to be taken, upon flowing from main 1 through meter 3 and through main 2, will effect the operation of meter integrator 8, in accordance with the volume of gas passing through the meter. The shaft extension 9 of the integrator, and cam 10 which is affixed thereto, will rotate accordingly in direct proportion to the gas flow. This rotation of cam 10 will, once during each revolution thereof, restrict the discharge of air from nozzle 29 of pilot valve 5, and cause the bellows 28 to expand under a gas pressure of say 1 or 2 pounds exerted through passage 38 into the bellows. Valve stem 33 will then become elevated, carrying its cut-off element 35 above the passage to line 13 as shown in Fig. 2, thereby permitting the passage of pneumatic power from line 30 through line 36, the valve 5, and line 13 to fluid operated power unit 4. The cut-off element 34 on valve stem 33 merely serves as a seal to prevent the discharge of air from the passages of the valve 5 past the movable valve stem 33 to the lower portion of the valve. Transmission of power fluid to power unit 4 results in the depression of diaphragm 11, and drive stem 15, which, through fulcrumed lever 18 and pawl 20, effects the partial rotation of ratchet wheel 21, the degree of rotation depending on the position of the stroke adjusting screw member 17. As a consequence, sprocket 23 carrying sprocket chain 25 with it will experience the same degree of rotation and cause the bell 24 of the gas sample holder to be raised a predetermined distance. Gas from main 2 will then be drawn through sampling line 27 into the bell of sample holder 6. To assure the obtaining of equal increments of gas with each rise of bell 24, back pressure regulator 7 is installed in gas main 2 to maintain substantially constant pressure at the sampling point.

When the node of cam 10 passes beyond the nozzle 29 of pilot valve 5, the pilot valve will return to closed position which is the condition of the valve during the greater part of the rotation of cam 10, as shown in Fig. 3. The nozzle 29, being no longer restricted by the cam, will again discharge air freely, preventing the building up of pressure within the bellows 28 and permitting the bellows to return to its normal contracted position. This contraction causes pilot valve stem 33 to recede to the point where cut-off element 35 blocks the passage of pneumatic power through the valve 5 to line 13. It further permits the air under pressure above diaphragm 11 of power unit 4 to discharge through line 13 and exhaust port 37 of the pilot valve 5 into the atmosphere. The return of atmospheric pressure above the diaphragm 11 permits the spring 14 to elevate the diaphragm 11 and drive stem 15 to their normal positions. This also causes pawl 20 to slip on ratchet wheel 21 and take a new position ready to again effect partial rotation of ratchet 21 on the next movement of the diaphragm. The ratchet wheel 21 will not move backward at this time due to the restricting effect of pawl 22.

Thus each time the cam 10 completes a revolution restricting nozzle 29, the sprocket-wheel 23 rotates in measured degree and gas holder bell 24 moves upward a certain predetermined distance causing a quantity of gas to pass from gas main 2 through sampling line 29 into the gas sample holder 24. When the node of cam 10 has passed beyond nozzle 29 of the pilot valve, free discharge through nozzle 29 will be resumed and the flow of energizing fluid to power unit 4 will be discontinued.

To collect a sample over a period of time, the node of cam 10 will pass the nozzle of pilot valve 5 a multitude of times and gas sample holder bell 24 will be raised each time to receive successive increments of gas from gas main 2. Therefore, the sequence of operations described in detail above will be repeated many times during the process of obtaining a sample, according to the length of time over which the sample is gathered.

Many modifications of the above described invention may be embodied and many equivalents of the respective elements of the sampling system may be used without departing from the spirit and scope of this invention. For example, instead of using an external air supply for actuating the control mechanism, if the fluid to be sampled is a gas, valve 39 may be opened, and valve 41 in line 30 closed to provide a passage for a pressure controlled pneumatic power medium from main conduit 2 to pilot valve 5. On the other hand, if an external source of pneumatic power is to be used, valve 41 would be opened and valve 39 closed.

This invention is especially adaptable for obtaining a sample under law pressure, that is a pressure of less than one pound per square inch, gauge, but it may also be readily used with gas of a much greater pressure either by placing a pressure reducing valve in sampling line 27 from main 2 to gas-holder 6 or by designing the gas-holder with its weight so proportioned to its cross section that the bell 24 will not be blown out of base 6.

I claim:

1. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit, a gas holder to receive the desired sample, a sampling tube connecting said gas conduit and said gas holder, a power unit adapted to increase the capacity of said gas holder by a fixed increment at each actuation of the power unit, a pilot valve to supply energizing force to the said power unit and means operatively controlled by the said meter to actuate the pilot valve each time a predetermined volume of gas passes through the said meter.

2. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit, a gas holder to receive the desired sample, a sampling tube connecting said gas conduit and said gas holder, a pneumatically operated power unit adapted to periodically increase the capacity of said gas holder by a fixed increment at each actuation of the power unit, a pneumatically operated pilot valve to supply energizing force to the said power unit, and means operatively controlled by the said meter to actuate the pilot valve each time a predetermined volume of gas passes through the said meter.

3. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit and fitted with a shaft rotatable in direct proportion to the volume of gas passed therethrough, a gas holder to receive the desired sample, a sampling tube connecting said gas conduit and said gas holder, a power unit adapted to increase the capacity of said gas holder by a fixed increment at each actuation of the power unit, a pilot valve to supply energizing force to the said power unit, and means comprising a cam attached to the said meter shaft to actuate the pilot valve each time predetermined volume of gas passes through the said meter.

4. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit and provided with an integrator having an extended shaft which rotates in direct proportion to the volume of gas passed therethrough, a gas holder to receive the desired sample, a sampling tube connecting said gas conduit and said gas holder, a power unit adapted to increase the capacity of said gas holder by a fixed increment at each actuation of the power unit, a pilot valve to supply energizing force to the said power unit, and means comprising a cam attached to the said meter integrator shaft to actuate the pilot valve each time a predetermined volume of gas passes through the said meter.

5. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit and fitted with a shaft that rotates in direct proportion to the volume of gas passed therethrough, a gas holder to receive the desired sample, a sampling tube connecting said gas conduit and said gas holder, a pneumatically operated power unit adapted to increase the capacity of said gas holder by a fixed increment at each actuation of the power unit, a pneumatically operated pilot valve to supply energizing force to the said power unit, and means comprising a cam attached to the said meter shaft to actuate the pilot valve each time a predetermined volume of gas passes through the said meter.

6. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit and provided with an integrator having an extended shaft which rotates in direct proportion to the volume of gas passed therethrough, a gas holder to receive the desired sample, a sampling tube connecting said gas conduit and said gas holder, a pneumatically operated power unit adapted to increase the capacity of said gas holder by a fixed increment at each actuation of power unit, a pneumatically operated pilot valve to supply energizing force to the said power unit, and means comprising a cam attached to the said meter integrator shaft to actuate the pilot valve each time a predetermined volume of gas passes through the said meter.

7. A device for incrementally accumulating a composite sample of gas from a flowing stream thereof comprising a gas conduit adapted to convey a flowing stream of gas, pressure regulating means to maintain substantially uniform pressure in said gas conduit, a meter interposed in said gas conduit and provided with an integrator having an extended shaft which rotates in direct proportion to the volume of gas passed therethrough, a bell type gas holder to receive the desired sample, a sampling tube connecting said gas conduit and said gas holder, a pneumatically operated power unit adapted to periodically increase the capacity of said gas holder by a fixed increment at each actuation of the power unit, a pneumatically operated pilot valve to supply energizing force to the said power unit, and means comprising a cam attached to the said meter integrator shaft to periodically actuate the pilot valve in proportion to the flow of gas through the said meter.

8. A device for incrementally accumulating a composite sample of gas from a flowing stream thereof comprising a gas conduit; a pressure regulator adapted to maintain uniform pressure in said gas conduit; a gas meter interposed in said gas conduit and fitted with a shaft adapted to rotate with a frequency proportioned to the volume of gas passed through said meter; a gas holder to receive a proportioned sample of gas; a second conduit extending from the first mentioned conduit to the gas holder; a pneumatically energized power unit, connecting means for enlarging the capacity of the gas holder with each energization of the said power unit; a third conduit to conduct a gas to the power unit to energize the same; a pilot valve interposed in the third mentioned conduit and adapted to alternately permit and interrupt the flow of energizing fluid therethrough, and to relieve the pressure of such energizing fluid on the said power unit when the pilot valve is in position to interrupt the flow thereof; and means fitted on the rotating shaft of the gas meter and serving to actuate the pilot valve.

9. A gas sampling system comprising, a gas main, means for maintaining substantially uniform pressure in said gas main, a gas meter interposed in said gas main, a gas sample holder, connecting means between said gas main and said sample holder, fluid operated means to vary the capacity of said sample holder, control means for supplying operating fluid to said last named means, and means operatively controlled by said meter for energizing said control means in accordance with the flow of gas through said meter.

JOSEPH A. PELLETTERE.

REFERENCES CITED

The following references are of record in the file of this patent:

UNITED STATES PATENTS

| Number | Name | Date |
|---|---|---|
| 1,364,035 | Carter, Jr. | Dec. 28, 1920 |
| 1,537,568 | Thompson et al. | May 12, 1923 |
| 1,649,399 | Gard | Nov. 15, 1927 |
| 1,953,061 | Blackwood et al. | Apr. 3, 1934 |
| 2,350,323 | Cochran et al. | June 6, 1944 |
| 2,418,876 | Grace, Jr. | Apr. 15, 1947 |